March 27, 1962 E. A. KUBIAK ETAL 3,026,810
VARIABLE DISPLACEMENT PUMP
Filed Sept. 12, 1956 3 Sheets-Sheet 1

Inventors:
Emil A. Kubiak and
John M. Herberth
By: Joseph R. Dwyer
Atty.

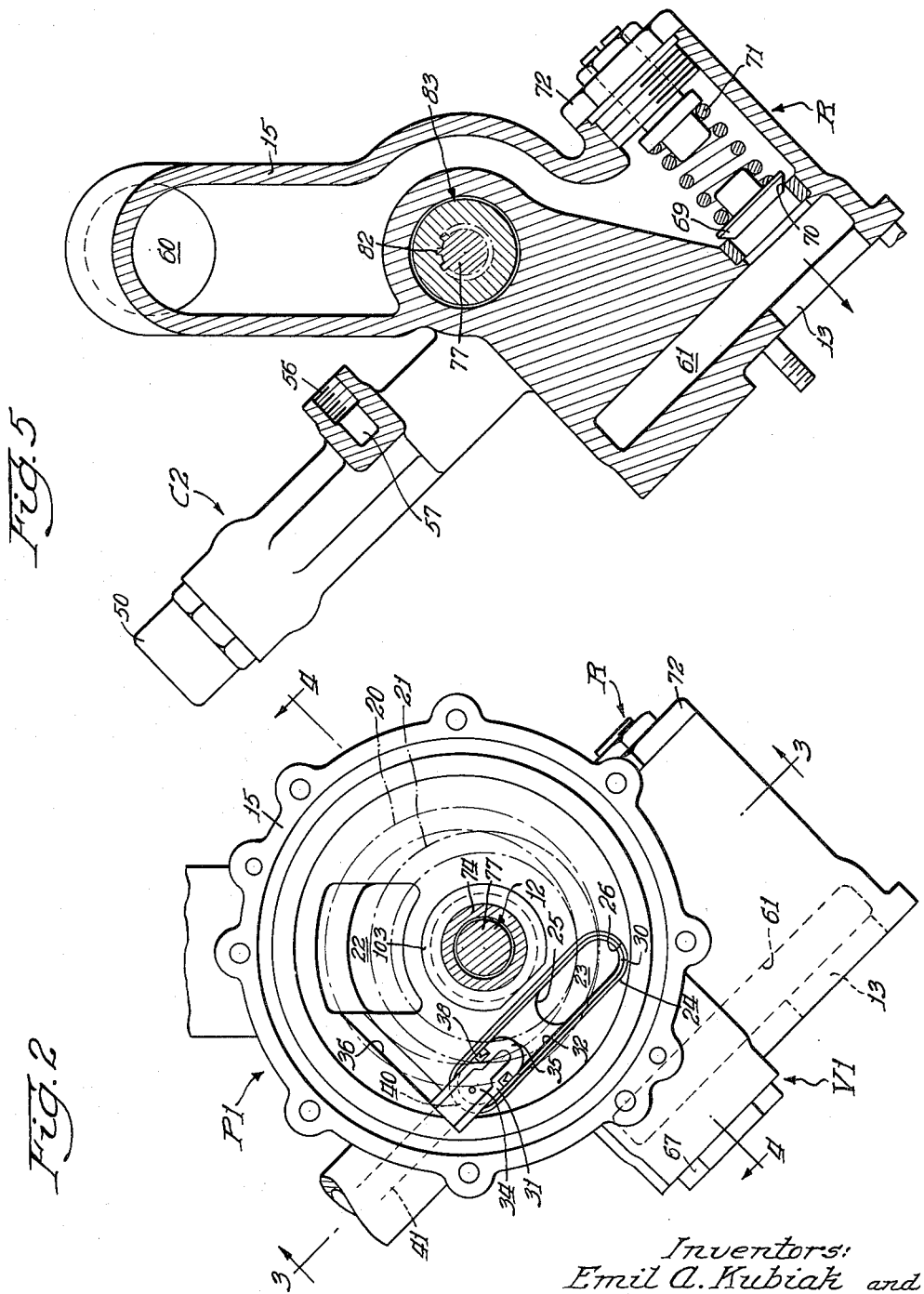

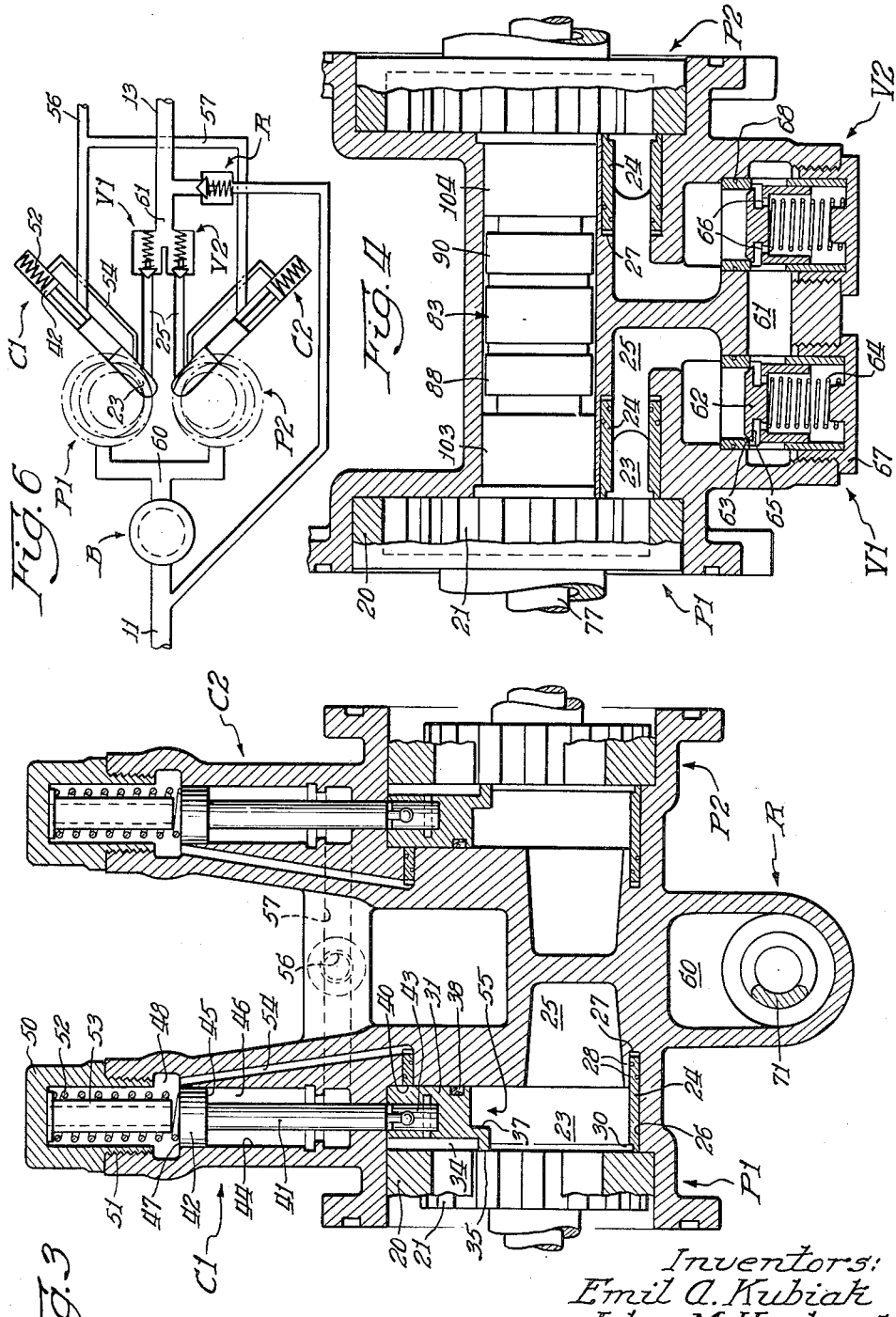

United States Patent Office 3,026,810
Patented Mar. 27, 1962

3,026,810
VARIABLE DISPLACEMENT PUMP
Emil A. Kubiak, Cleveland, and John M. Herberth, Maple Heights, Ohio, assignors to Borg-Warner Corporation, Chicago, Ill., a corporation of Illinois
Filed Sept. 12, 1956, Ser. No. 609,384
2 Claims. (Cl. 103—120)

This invention relates to internal-external gear pumps and more particularly to pumps of the type constructed with an external gear or pinion disposed within and eccentric to an internal or ring gear, and being provided with means whereby the displacement of the pump may be varied.

The usual type of internal-external gear pump, which provides isolated fluid pockets formed by the gear teeth as they mesh, provides a fixed displacement, thereby precluding their use in certain applications wherein there is required, from time to time, a variance in the displacement or quantity of fluid discharged, as for example, when used as a fuel pump to supply varying amounts of fuel to an aircraft engine, engines, or the like.

Therefore, the principal object of this invention is the provision of an improved variable displacement internal-external gear pump.

The pump forming the subject matter of this invention and which accomplishes this principal object is so constructed to provide such a variable displacement means of a controlled pressure applied from an external source to a control piston assembly means associated with the pump. The control piston assembly means is so constructed to cooperate with and move a slide means disposed within a confining port, so as to vary the communication between the pump outlet and the fluid pockets formed by intermeshing gear teeth and allow a variable displacement delivery therefrom according to the pressure from the aforementioned external source.

In order to prevent undue leakage across the juncture of the gear side faces and the confining port, the confining port is hydraulically urged into sealing engagement with the gear side faces. This pressure loading of the confining port forms another important aspect of this invention and is accomplished by means of outlet pressure applied behind the confining port.

Another object of this invention is the provision of an improved variable displacement internal-external gear pump, the displacement of which is controlled by means of an external fluid pressure.

A still further object of this invention is the provision of an improved gear pump constructed with internal and external meshing gears incorporating means so constructed and arranged to cooperate with the meshing gears to vary the communication between the pockets formed by the meshing gears and the outlet and under the control of a control piston assembly means.

Another and still further object of this invention is the provision of a variable displacement gear pump incorporating internal and external meshing gears and being provided with a slide means so constructed and arranged to cooperate with the meshing gears to vary the communication between the pockets formed by the gears as they mesh into the outlet, the slide means being controlled by a control piston assembly means.

Another and still further object of this invention is the provision of a variable displacement gear pump incorporating internal and external meshing gears and being provided with a slide means so constructed and arranged to cooperate with the meshing gears to vary the communication between the pockets formed by the gears as they mesh into the outlet, the slide means being controlled by a control piston assembly means, which in turn is subjected to an external control pressure for varying the position of the slide means.

A still further object of this invention is the provision of a variable displacement internal-external gear pump having a slide means associated therewith for varying the degree of communication between the pockets formed by the meshing gear teeth and the outlet and having a confining port structure in which the slide means is disposed, the confining port being hydraulically urged into sealing engagement with the gear teeth to hold leakage across the gear side faces to a minimum.

The above briefly described pump has been found to be particularly useful in aircraft fuel pumps wherein more than one of these variable displacement pumps are commonly driven and coupled through a plurality of shear section means allowing one or more of such pumps to seize and shear but providing for the continuation of the other pump or pumps in a case of emergency. This particular use of this internal-external gear pump in an aviation type pump assembly will be explained in connection with a more detailed description of the operation of this invention.

Still another goal of this invention is the provision of a variable displacement internal-external gear pump, the displacement of which is controlled by an external fluid pressure and particularly adaptable for use in aircraft.

A still further goal of this invention is the provision of a plurality of variable displacement internal-external gear pumps, adapted to be commonly driven in tandem by a common driving means and having the displacement of both pumps controlled by an aircraft engine fluid pressure source.

A still further goal of this invention is the provision of a plurality of variable displacement internal-external gear pumps adapted to be commonly driven in tandem by an aircraft engine and utilizing the aircraft engine fuel demand for varying the displacement of the gear pumps.

These and other objects and features of the invention will become apparent from the following description when taken together with the accompanying drawings, in which:

FIGURE 2 is a sectional view taken along line 2—2 of FIGURE 1 and showing to advantage the confining port and the slide means of one pump and cooperating with the intermeshing gear teeth pockets to vary the displacement of such pump;

FIGURE 3 is a sectional view taken along line 3—3 of FIGURE 2 and showing to advantage a pair of control piston assembly means which cooperate with their respective slide means for varying the displacement of both gear pumps shown in FIGURE 1 and also illustrating to advantage the particular configuration of the slide means;

FIGURE 4 is a sectional view taken along lines 4—4 of FIGURE 2 and showing to advantage the manner of pressure loading the confining port and slide means located in the outlet of each pump;

FIGURE 5 is a sectional view taken along lines 5—5 of FIGURE 1 and showing to advantage the inlet and outlet ports formed in the housing; and FIGURE 6 is a schematic showing of the hydraulic circuit connecting the inlet boost pump and the pair of internal-external gear pumps with their respective piston assemblies in an aircraft fuel pump.

Figure 1:
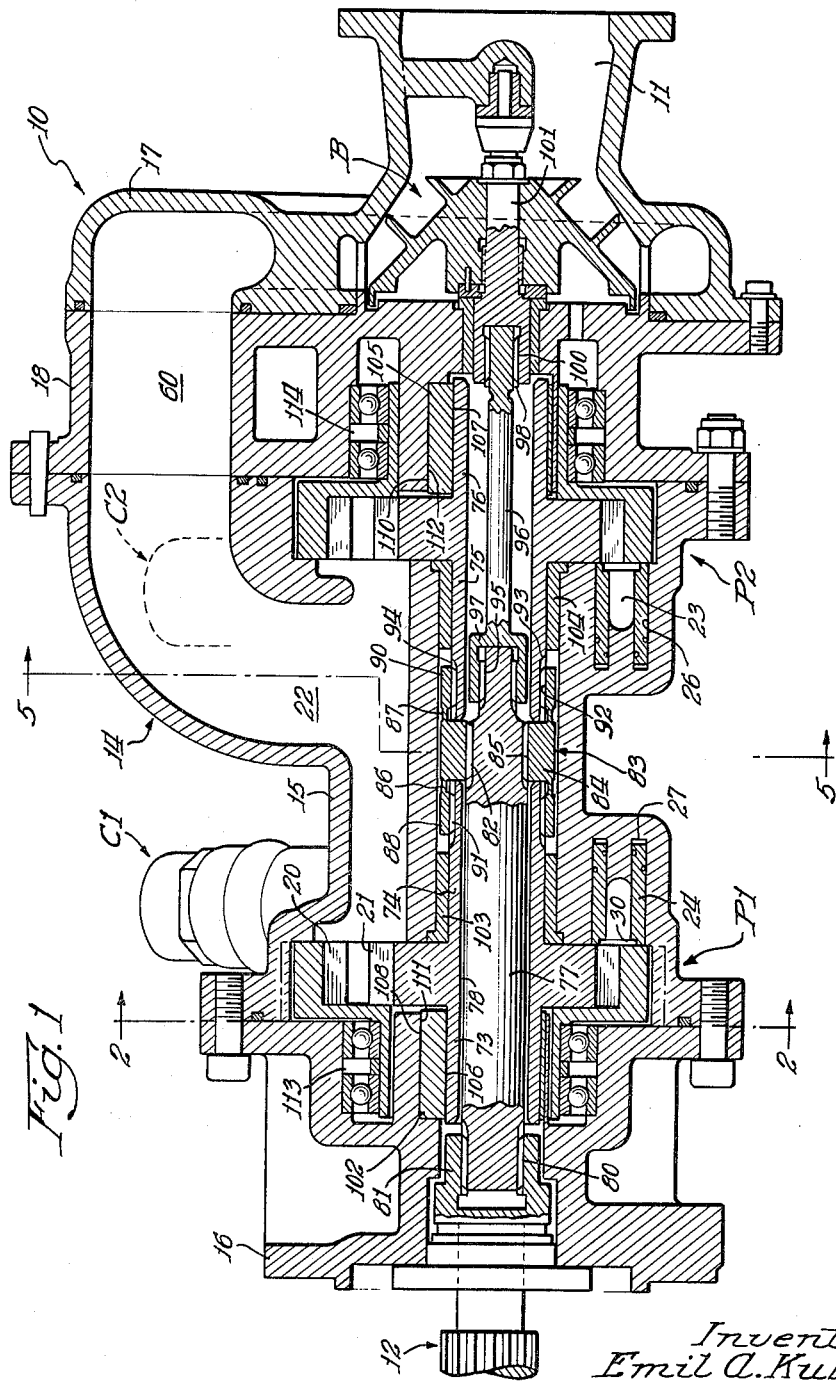
FIGURE 1 is a longitudinal sectional view of a pair of internal and external gear pumps, each constructed in accordance with the teachings of this invention and shown in a common housing as an aircraft fuel pump with an inlet boost pump all of which are adapted to be driven by a common driving means.

Referring now to the drawings, there is illustrated a pair of variable displacement internal-external gear pumps P1 and P2, the displacement of each pump being varied by piston control assemblies C1 and C2, respectively, the combination of which with pumps P1 and P2 form an important aspect of this invention, and as illustrated, are a part of an aircraft fuel pump assembly, indicated in its entirety as 10. The pump assembly 10 has an inlet 60 common to both pumps P1 and P2, and a conventional inlet boost pump B having an inlet 11 is mounted to be driven in tandem by a common source of power (not shown) through a common driving means, indicated in its entirety as 12. The pumps P1 and P2 are adapted to discharge into a common outlet 13 through a pair of one-way control valves V1 and V2 (FIG. 4), the outlet 12, the pumps P1, P2 and B being disposed in a housing 14. A suitable relief and regulating valve R (FIG. 5) is operatively located between the common outlet 13 and the common inlet 11. The housing 14 comprises a body 15, a pair of cover members 16 and 17, and an intermediate portion 18, all suitably affixed to each other by bolt means, or the like, and provided with a plurality of seal means disposed where necessary and desirable.

Attention is now directed to FIGURES 2 and 3 of the drawings depicting the internal working parts, in cross-section, of pump P1 and the control piston assemblies C1 and C2. Since P1 and P2 are identical and C1 and C2 are identical, a detailed description of P1 and its associated controlled piston assembly C1 is only deemed necessary herein.

Pump P1 comprises an internal or ring gear 20 eccentrically disposed about the axis of rotation of the driving means 12 and intermeshing with an external gear or pinion 21 concentrically disposed about and rotatably mounted on the common driving means 12. The manner of affixing the pinion 21 to the drive means 12 will be described in more detail hereinafter. Rotation of the gears 20 and 21 causes fluid entering the pump P1—through its associated inlet 22 formed in the housing 14 and from the common inlet 11—to be discharged under pressure—through its associated variable outlet 23 and (more clearly shown in FIGURE 3)—by reason of the plurality of moving gear teeth pockets which decrease in volume between the inlet 22 and the outlet 23. An elongated, relatively thin, hollow-bodied port confining ring 24 of a width equal to and surrounding an elongated outlet passage 25 is slidably disposed in a recess 26 formed in the housing 14, and on one side engages the gear side faces and on the other side (opposite the gear side faces) forms, with an extension of the recess 26, a pressure control chamber 27. Discharge pressure communicated to the pressure control chamber 27 urges the confining ring 24 in the direction of the gear side faces to establish a sealing relationship therewith, and prevent an undue leakage of fluid across the gear side faces from outlet to inlet. To provide for initial loading of the confining ring, a relatively flat wafer spring is disposed in the pressure control chamber 27. Leakage from the pressure chamber 27 is prevented by suitable O-ring sealing means 28, 28 disposed in suitable grooves in the confining ring 24 or in the recess 26 formed in the housing 14. The gear engaging side of the slidable confining ring 24 may be grooved or counterbored, as at 30, so as to be subjected to discharge pressure to control the effective force at which said confining ring is urged against the gear side faces, this being accomplished by the proper selection of the size of the groove 30 with respect to the side being acted upon by pressure in pressure control chamber 27. The internal or ring gear may constitute the driving gear instead of the external gear or pinion without departing from the spirit of this invention.

A slide member 31 is slidably disposed within the confining ring 24 and is arranged to move parallel to the gear side faces, and toward and away from the outlet passage 25. The slide member 31 is suitably formed of a width sufficient to provide sliding contact with the inner periphery 32 of the confining ring 24, and of a height to provide a sliding contact between an inner face 33 of the housing 14 and the gear side faces. The gear side face engaging surface of the slide member 31 is provided with an open-ended, cut-away, portion 34 which forms a substantially U-shaped lip portion 35, the closed portion of the U-shaped lip portion being located adjacent the outlet 23, and the open-ended portion being placed in communication with inlet by passage 36, the purpose of which will be described in detail hereinafter. As more clearly shown in FIGURE 3, the lip portion 35 is in sealing contact with the gear side faces, thereby providing a dam-like action allowing fluid in the gear pockets in advance of the slide member 31 to flow to outlet and allow fluid in the gear pockets behind the lip portion to flow through the passage 36 to flow back to inlet. Leakage of fluid across the lip portion providing the dam-like action is substantially prevented because of discharge pressure acting on a pressure receiving surface 37 facing away from the gear side faces, so that the lip portion is sealingly urged toward the gear side faces. Leakage of pressure around the slide member 31 is prevented by suitable sealing means 38 disposed in a groove about that portion of the periphery of the slide member 31 in contact with the face 33 and the inner periphery 32 of the confining ring 24, and also, by action of the pressure in the pressure loading chamber 27 urging the confining ring 24 towards the gear side faces. The confining ring 24 is suitably reduced in depth at one end, as at 40, to permit the slide member 31 to freely move in sliding contact with the face 33, and the bottom of the groove is in contact with the slide member 31, so that the pressure loading function of the confining ring also acts in pressure loading the slide member 31.

Thus, movement of the slide member 31 and cooperation of the dam-like action of the lip portion 35 with the gear teeth pockets provide the variable outlet 23 by which the number of gear teeth pockets exposed may be varied to vary the volume of fluid being discharged by the pump.

The pump P1, providing variable displacement by the cooperation between the gear teeth and the sliding member 31, is connected to the control piston assembly C1, so as to make the pump P1 responsive to flow demand made up the pump. The control assembly C1 comprises an elongated rod 41 terminating at one end in an enlarged head forming a piston 42 and at the other end forming a part of a universal ball joint assembly 43 which connects the slide member 31 with the rod 41 for conjoint universal action. The rod 41 and the piston 42 are slidably received in a cylindrical bore 44 formed in the housing 14, one side or surface 45 of the piston head in cooperation with the bore 44 providing a first fluid pressure chamber 46 subject to fluid pressure (later to be described) which reacts with side 45 tending to move the piston rod and the slide member 31, connected therewith, to a position allowing more of the gear teeth pockets to be uncovered by the slide member 31. On the surface 47 of piston 42 facing opposite to the surface 45 there is provided a second fluid pressure chamber 48 formed in part by the continuation of the cylindrical bore 44 cooperating with a hollow cap-like member 50, a portion of which is suitably received in the cylindrical bore 42 and affixed to the housing 14 as by threads 51. Seated against surface 47 is one end of a resilient means such as a helical coil compression spring 52, the other end of which reacts against the bottom of cap member 50 tending to urge the piston 42, rod 41, and slide member 31 in a direction opposite to the direction of movement caused by the fluid pressure in the first pressure chamber 46. A suitable spring retainer 53, seated at one end against the cap 50, is received within the coils of spring 52 and is normally of a lesser length than the spring to suitably locate spring 52 and prevent over-travel of the piston 42 in the direction urged by the pressure in the first pressure chamber 46. In addition to the spring pressure acting upon surface 47, discharge pressure is admitted into the second pressure chamber 48 through passage 54 communicating at one end with the chamber 48 and at the other end, in the embodiment shown, with the pressure control chamber 27 formed in part by the confining ring 24. However, conduit means may be provided from any part of the pump outlet to supply the pressure to the chamber 48, without departing from the spirit of this invention. It is important to note that the area of surface 47 subject to discharge pressure in the second pressure chamber 48 is equal to the area 55 of the slide member 31, also subject to discharge pressure and forming a part of the variable outlet 23, so that the discharge pressure acting on the slide surface 55 is balanced by the pressure acting on the piston surface 47. Obviously any pressure in the first pressure chamber 46 will thus react against the pressure of spring 52 and movement of the piston 42 will be solely responsive to the spring pressure on the one hand and the control pressure in the first pressure chamber 46 on the other hand.

In order to make the pump P1 responsive to a demand made on it, fluid pressure is admitted into the first pressure chamber 46 of the control assembly C1 from a source of pressure external to the pump assembly itself and, in the embodiment shown, such pressure is communicated to the first pressure chamber 46 through conduit 56 which in turn is connected to a kidney shaped pressure control chamber 57, the pressure in which is varied externally by any suitable means according to the desired displacement of pump P1. It is understood that the pressure in pressure control chamber 57 is also communicated to control assembly C2 to vary the displacement of pump P1 in a similar manner to conjoint action of pumps P1 and P2 as an aircraft fuel pump to hereinafter be more fully described.

Having thus explained in detail the structure of the variable displacement pump P1 in combination with the control assembly C1, the operation of pump P1 in control assembly C1 will now be described. It is to be understood, of course, that pump P2 and its associated control assembly C2 being identical, though in the embodiment shown, symmetrical to pump P1 and assembly C1 operate in similar manner and thus the description of the operation of pump P1 and control C1 will suffice.

Fluid entering the inlet 22 of pump P1 is discharged under pressure into the variable outlet 23 formed by the confining ring 24 and the slide member 31 and thence into the outlet passage 25 to be conducted through the main outlet 13. Pressure in the outlet passage 25, being communicated to the pressure control chamber 27 formed in part by the confining ring 24, serves to urge the confining ring 24 against the gear side faces to suitably seal the gear side faces against leakage, and pressure from this chamber 27 is communicated through passage 54 into the second pressure chamber 48, so as to counter-balance the pressure in the variable outlet 23 and acting upon the side face 55 of the slide member 31. As previously described movement of the slide member varies the amount of fluid discharged by the gear teeth pockets and this variation is controlled by the pressure of the spring 52, the fluid pressure in the first pressure chamber 46 acting upon surface 45, which pressure is communicated thereto from an external pressure source 57 through passage 56. Any decrease in pressure in the first pressure chamber 46 will result in less displacement of pump P1 by reason of movement of the slide member 31 by the force of the spring 52 and any increase in pressure in the chamber 46 overbalancing the force of spring 52, will result in greater displacement of pump P1.

Turning now to FIGURE 1 there is shown the aircraft fuel pump assembly 10 having variable displacement pumps P1 and P2 mounted on the common driving means 12 and disposed within the common housing 14. It can be seen that fluid from a source of fluid, such as an aircraft fuel tank, enters the inlet 11 and is subjected to the operation of the booster pump B, also mounted on the common driving means 12. Operation of the booster pump B serves to increase the pressure on the fuel and eliminate any vapors that may exist therein in a well-known manner. Since the details of the booster pump B and the operation thereof are described in more detail in copending application, Serial No. 466,562, filed November 3, 1954, of the same assignee, now abandoned and refiled as continuing application S.N. 72,836 filed November 28, 1960, no further description thereof is deemed necessary herein. It being understood that while the Lock type axial flow booster pump is preferred, any booster pump which will function to eliminate vapor and increase the inlet pressure will suffice.

Pressure discharged by the booster pump B is communicated into inlet passage 60 which provides a common inlet to pumps P1 and P2. As hereinabove explained, fluid entering the respective inlets of pumps P1 and P2 is discharged out their respective outlets and since the outlet of P2 is identical to the outlet of P1 a description of the flow from P1 to main outlet 13 of the aircraft assembly will suffice.

The discharge passage 25 of pump P1, more clearly shown in FIGURES 3 and 4, is placed in fluid communication with a common discharge or outlet passage 61 through the one-way valve assembly V1 and thence into the common outlet 13 (see FIGURE 5). One-way valve assembly V1 comprises a frusto-conical shaped valve proper 62 urged against a seat 63 by a resilient means such as a helically coiled compression spring 64 in opposition to the fluid pressure in outlet passage 25 from the pump P1. A groove 65 and the passages 66 are provided on the side of the valve proper 62 opposite from the passage 25 and are in communication with the outlet passage 61 to prevent hydraulic lock behind the valve proper. The force to be exerted by compression spring 64 is a matter of choice and may be varied by cap 67 threadably received in the housing 14 and against which one end of the spring 64 rests. Also, obviously, suitable sealing means, such as O-ring seals 68, may be disposed about the valve assembly V1 where necessary and desirable. These one-way valve assemblies V1 and V2 in cooperation with their respective pumps prevent the pressure form either pump from returning to the other pump in the event of failure of either pump as a safety measure during operation of the aircraft pump assembly, otherwise, pressure from the operating pump would cause the non-operating pump to act as a motor with resultant loss of efficiency of the operating pump. Also, in connection with the pressure discharged into the common or main outlet 13, the pressure relief and regulating valve R operatively located between main outlet 13 and inlet passage 60 comprises a one-way valve proper 69 of the frusto-conical type which is urged against the valve seat 70 by resilient means such as a helically coiled compression spring 71 and provides suitable relief and regulation of the total pressure discharged from the outlet 13 in the embodiment shown. Any pressure increase in the outlet 13 beyond a value determined by the compression force of the spring 71 will remove the valve proper 69 from its seat and fluid under pressure will be admitted into the inlet passage 6. The force of the spring 71 is a matter of choice and can be closely regulated by the positioning of the cap means 72 threadably received in the housing and against which one end of the spring 71 rests.

To facilitate the understanding of the aircraft fuel pump assembly as a whole, the various parts of the pump assembly are shown in the schematic flow diagram comprising FIGURE 6. In this figure it can be seen that fluid enters inlet 11 and is subjected to the operation of the booster pump B which discharges compressed and substantially vapor free fuel into the inlet passage 60 common to both pumps P1 and P2. Fluid, discharged by both pumps into their respective outlets, is forced past the pair of one-way valve assemblies V1 and V2 and into the main or common outlet 13. The relief and pressure regulating valve R is in fluid communication with the inlet 11, in this diagram, by a flow passage communicating directly back to the inlet 11. Pumps P1 and P2 are each provided with a control assembly C1 and C2, respectively, to regulate the displacement of the respective pumps, and it is to be noted that each of the pressure control pistons of the respective control assemblies is hydraulically balanced against the pressure in the respective variable outlets of the respective pumps by fluid communication through passages, such as 54 of assembly C1, and that the respective springs, such as 52 of assembly C1, are in opposition to an external source of pressure in the respective control chamber communicated thereto through passages, such as 56 of pump P1.

In order to describe in more detail the common driving means 12 to which the internal-external gear pumps P1, P2 and boost B are connected in continuous driving relation attention is directed to FIGURE 1 of the drawings where there is shown the respective hollow external gears or pinions of pumps P1 and P2, each of which are provided with a pair of hollow, axially oppositely extending, sleeves 73, 74, 75 and 76, respectively. The oppositely extending sleeves 73 and 74 of the pump P1 receive an elongated cylindrical quill shaft 77 having an outer diameter slightly less than the inner diameter 78 of the respective sleeves and which is externally splined at its left end at 80, as shown in the drawings, to receive in complementary driving relationship an internally splined coupling member 81. The end of the coupling member opposite the internal splines is externally splined and extends outwardly beyond the housing 14 to be drivingly connected to a suitable source of power (not shown). Suitable shaft sealing means is provided between the rotating coupling member 81 and the stationary housing 14. Such sealing means may take the form of that shown and described in the Roth Patent No. 2,434,589, issued January 13, 1948. Since the construction and operation of such sealing means are described in detail in the above-identified patent, no further description thereof is deemed necessary herein.

The right end of quill shaft 77 protrudes beyond the sleeve 74 and is provided with an intermediate externally splined portion 82 to be received in a hollow sleeve means 83 having an enlarged middle portion 84 which is internally splined as at 85 to be connected in complementary relationship with the splines 82. On each side of the enlarged central portion 84 of the sleeve 83 there is provided a reduced weakened shear section 86, 87 which frangibly connect the oppositely extending sleeve like outer ends 88 and 90, respectively, of the sleeve 83. These outer ends are internally splined as at 91 and 92, respectively, to receive in complementary driving relationship the external splines 93 and 94 formed on the respective outer periphery of the sleeve 74 and 75. Thus, it can be seen that the coupling member 81, being drivingly connected to the quill shaft 77, is in turn drivingly connected to each of the respective external gears or pinions of pump P1 and P2 through the cooperation of the internal and external splines of the quill shaft, the sleeve means 83, and the sleeves of the respective gears. In the event of seizure of one of the pumps, such as for example P2, the reduced shear portion 87 will shear and disconnect the pump P2 from the quill shaft 77 enabling the quill shaft to continue to drive pump P1. Quill shaft 77 is further reduced and extended at its far right end to protrude beyond the sleeve 83 and is externally splined, as at 95, to connect in driving relationship, a second quill shaft 96. Quill shaft 96 is provided with an enlarged, hollowed, internally splined portion 97 to be drivingly connected to the external splines 95 in complementary driving relationship.

The opposite end of the quill shaft 96 is externally splined, as at 98 to be drivingly connected to internal splines 100 of the booster pump shaft 101. As thus connected, booster pump B will continue to be rotated by the coupling 81 whether or not either or both of pumps P1 and P2 are sheared from the quill shaft 77.

The sleeves 73, 74, 75 and 76, being cylindrical in configuration and mounted for concentric rotation about the axis of the driving means 12, are respectively received within suitable sleeve bearings 102, 103, 104 and 105, the bearings 102 and 105 each having a concentric circular inner periphery 106 and 107 and an eccentric outer periphery 108 and 110 to accommodate and to be received in respective bores 111 and 112 eccentric to the axis of rotation of the pinions. The purpose of these eccentric bores are to allow only concentric boring of the housing 14. The internal or ring gears are rotatably disposed within and supported by ball bearings 113 and 114 received in suitable bores in the housing.

From the foregoing description of this invention, it can be seen that this invention comprises in its broadest aspects the provision of a variable displacement internal-external gear pump, the displacement of which is varied by a controlled slide means in connection with a piston assembly and is useable in combination with a similar pump and a boost pump commonly driven therewith in an aircraft fuel pump assembly. While there has been disclosed a preferred driving connection incorporating specific shear section means, for use in this aircraft pump assembly, other shear section assemblies such as described and claimed in the U.S. Patents Nos. 2,665,637 and 2,665,638 issued to J. A. Lauck and dated January 12, 1955, or the shear section described and claimed in Serial No. 499,155, filed April 4, 1955, now abandoned, may be used equally as well without departing from the spirit of the broad aspects of the pump and control assembly combination described herein.

While the various parts of this invention have been described as upper and lower or in right or left position, such description refers only to the relative position of the parts as shown in the drawings and is not intended to be a limitation of the invention and it is understood that the appended claims should be construed as broadly as the prior art will permit.

We claim:

1. In an aircraft fuel pump assembly, the combination of a housing, a plurality of commonly driven axially spaced pump means disposed in said housing, one of said pump means comprising a centrifugal boost pump, first inlet means in said housing and in communication with said boost pump, an outlet for said boost pump, the remaining pump means each including an internal or ring gear and a meshing external gear or pinion, second and common inlet means for said remaining pumps, said outlet for said boost pump being connected to said second and common inlet, an outlet for each of said remaining pump means connected to a common outlet, the gears of said remaining pump means forming a plurality of fluid pockets therebetween in communication with its respective outlet for performing said pumping function, said internal or ring gear of each of said remaining pump means being mounted eccentrically to said external gear or pinion, and displacement control means for each of said gear pump means operatively disposed between the gear side faces adjacent the said pockets and said respective outlets for varying the displacement of each of said remaining pump means, said control means including slide means operatively disposed between the gear sides adjacent the said fluid pockets and said outlets, control piston assembly means for each of said gear pump means, and means for applying an external source of fluid pressure to said control piston assembly means for changing the position of said slide means to vary the number of said fluid pockets exposed to each of said respective outlets to thereby vary the displacement of each of said gear pumps.

2. In an aircraft fuel pump assembly, the combination of a housing, a plurality of commonly driven axially spaced pump means disposed in said housing, one of said pump means comprising a centrifugal boost pump, first inlet means in said housing and in communication with said boost pump, an outlet for said boost pump, the remaining pump means each including an internal or ring gear and a meshing external gear or pinion, second and common inlet means for said remaining pumps, said outlet for said boost pump being connected to said second and common inlet, an outlet for each of said remaining pump means connected to a comon outlet, the gears of said remaining pump means forming a plurality of fluid pockets therebetween in communication with its respective outlet for performing said pumping function, said internal or ring gear of each of said remaining pump means being mounted eccentrically to said external gear or pinion, and displacement control means for each of said gear pump means operatively disposed between the gear side faces adjacent the said pockets and said respective outlets for varying the displacement of each of said remaining pump means, said control means including slide means operatively disposed between the gear sides adjacent the said fluid pockets and said outlets, control piston assembly means for each of said gear pump means, each control piston assembly being provided with resilient means urging said control piston and its associated slide means in one direction, and means for applying an external source of fluid pressure to said control pistons to overbalance said resilient means and to move said control pistons and their associated slide means in an opposite direction to vary the number of said fluid pockets exposed to each of said respective outlets to thereby vary the displacement of said gear pumps.

References Cited in the file of this patent

UNITED STATES PATENTS

| | | |
|---|---|---|
| Re. 23,086 | Holl | Feb. 22, 1949 |
| Re. 24,064 | Welch | Sept. 20, 1955 |
| 1,482,807 | Newberg | Feb. 5, 1924 |
| 1,486,682 | Phillips | Mar. 11, 1924 |
| 1,486,835 | Hill | Mar. 11, 1924 |
| 2,426,491 | Dillon | Aug. 26, 1947 |
| 2,484,789 | Hill et al. | Oct. 11, 1949 |
| 2,490,115 | Clarke | Dec. 6, 1949 |
| 2,509,321 | Topanelian | May 30, 1950 |
| 2,531,808 | Eames | Nov. 28, 1950 |
| 2,570,411 | Vickers | Oct. 9, 1951 |
| 2,575,154 | Zoll | Nov. 13, 1951 |
| 2,665,637 | Lauck | Jan. 12, 1954 |
| 2,665,638 | Lauck | Jan. 12, 1954 |
| 2,694,288 | Nubling | Nov. 16, 1954 |
| 2,699,724 | Murray et al. | Jan. 18, 1955 |
| 2,724,335 | Eames | Nov. 22, 1955 |
| 2,726,604 | Espelin et al. | Dec. 13, 1955 |
| 2,751,847 | Erikson | June 26, 1956 |
| 2,767,658 | Murray | Oct. 23, 1956 |
| 2,804,016 | Moore | Aug. 27, 1957 |
| 2,881,704 | Murray | Apr. 14, 1959 |
| 2,898,862 | Brundage | Aug. 11, 1959 |
| 2,925,044 | Brundage | Feb. 15, 1960 |

FOREIGN PATENTS

| | | |
|---|---|---|
| 415,425 | Germany | June 19, 1925 |